(12) United States Patent
Ihm (10) Patent No.: US 9,667,362 B2
(45) Date of Patent: May 30, 2017

(54) APPARATUS AND METHOD FOR SELECTING CHANNEL QUALITY INDICATOR IN COMMUNICATION SYSTEM

(71) Applicant: Samsung Electronics Co., Ltd., Gyeonggi-do (KR)

(72) Inventor: Bin-Chul Ihm, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 78 days.

(21) Appl. No.: 14/860,022

(22) Filed: Sep. 21, 2015

(65) Prior Publication Data

US 2016/0087777 A1    Mar. 24, 2016

Related U.S. Application Data

(60) Provisional application No. 62/052,699, filed on Sep. 19, 2014.

(30) Foreign Application Priority Data

Dec. 19, 2014 (KR) .................. 10-2014-0184694

(51) Int. Cl.
*H04B 17/309* (2015.01)

(52) U.S. Cl.
CPC ................. *H04B 17/309* (2015.01)

(58) Field of Classification Search
CPC .................................... H04B 17/309
See application file for complete search history.

(56) References Cited

U.S. PATENT DOCUMENTS

| | | |
|---|---|---|
| 2003/0021243 A1 | 1/2003 | Hamalainen |
| 2005/0272456 A1 | 12/2005 | Yoshii et al. |
| 2006/0057965 A1* | 3/2006 | Braun ................... H04W 36/30 455/67.11 |
| 2008/0256411 A1 | 10/2008 | Whinnett et al. |
| 2009/0010208 A1 | 1/2009 | Ishizaki |
| 2009/0075598 A1 | 3/2009 | Pietraski et al. |
| 2009/0163142 A1* | 6/2009 | Pi .......................... H04L 1/0026 455/62 |
| 2010/0183064 A1 | 7/2010 | Molnar et al. |
| 2010/0202284 A1 | 8/2010 | Tidestav |
| 2011/0026408 A1 | 2/2011 | Skarve et al. |
| 2011/0105046 A1 | 5/2011 | Molnar et al. |
| 2012/0276896 A1 | 11/2012 | Ren et al. |
| 2012/0300739 A1* | 11/2012 | Froberg Olsson .... H04L 1/0006 370/329 |
| 2013/0028307 A1 | 1/2013 | Ren et al. |
| 2013/0064122 A1 | 3/2013 | Hammarwall et al. |
| 2013/0095748 A1 | 4/2013 | Hu et al. |

(Continued)

FOREIGN PATENT DOCUMENTS

| | | |
|---|---|---|
| JP | 2005303836 | 10/2005 |
| KR | 1020090011117 | 2/2009 |
| KR | 1020140029660 | 3/2014 |

*Primary Examiner* — Duc C Ho
(74) *Attorney, Agent, or Firm* — The Farrell Law Firm, P.C.

(57) ABSTRACT

Disclosed is a method of operating a terminal in a communication system, including measuring channel quality, and transmitting a Channel Quality Indicator (CQI) based on the channel quality measured on the basis of a target BLock Error Rate (BLER), which is determined by using a ratio between efficiency corresponding to a first CQI and efficiency corresponding to a second CQI.

20 Claims, 6 Drawing Sheets

(56) References Cited

U.S. PATENT DOCUMENTS

| | | |
|---|---|---|
| 2013/0242975 A1 | 9/2013 | Krishnamurthy et al. |
| 2014/0029454 A1 | 1/2014 | Yu et al. |
| 2014/0098688 A1 | 4/2014 | Kang et al. |
| 2014/0098697 A1 | 4/2014 | Wang et al. |
| 2014/0220902 A1* | 8/2014 | Clevorn .............. H04B 7/0814 455/63.4 |
| 2014/0307645 A1* | 10/2014 | Ji ........................ H04L 1/0003 370/329 |
| 2015/0139125 A1* | 5/2015 | Bharadwaj ........... H04L 5/0055 370/329 |
| 2015/0271693 A1* | 9/2015 | Kang .................. H04W 24/02 370/252 |

* cited by examiner

APPARATUS AND METHOD FOR SELECTING CHANNEL QUALITY INDICATOR IN COMMUNICATION SYSTEM

PRIORITY

This application claims priority under 35 U.S.C. §119(e) to a U.S. Provisional application filed on Sep. 19, 2014 in the U.S. Patent and Trademark Office and assigned Ser. No. 62/052,699, and under 35 U.S.C. §119(a) to a Korean Patent Application filed on Dec. 19, 2014 in the Korean Intellectual Property Office and assigned Serial number 10-2014-0184694, the contents of each of which are incorporated herein by reference.

BACKGROUND

1. Field of the Disclosure

The present disclosure relates to a method of selecting a Channel Quality Indicator (CQI) in a communication system.

2. Description of the Related Art

In a wireless communication system, a transmitter measures quality of a radio channel and periodically delivers channel quality information (hereinafter, CQI) to a receiver. The CQI is selected from a plurality of CQI candidates based on whether an error rate of corresponding data exceeds a target reception error rate (hereinafter, a target BLock Error Rate (BLER)) when the transmitter transmits data according to the selected CQI. In the conventional CQI selection process, a BLER of 10% is applied equally to the plurality of CQIs and can decrease the error rate to be less than or equal to 10%, thereby collectively lowing the error rate. However, applying the 10% error rate is not optimal for maximizing throughput. Accordingly, there is a need in the art for a method for determining a target BLER capable of achieving throughput maximization and for selecting a CQI based on the target BLER.

SUMMARY

Accordingly, an aspect of the present disclosure provides an apparatus and method for selecting a CQI in a wireless communication system.

Another aspect of the present disclosure provides an apparatus and method for determining a target error rate in a wireless communication system.

According to an aspect of the present disclosure, a method of operating a terminal in a communication system includes measuring channel quality, and transmitting a CQI based on the channel quality measured on the basis of a target BLER, wherein the target BLER is determined by using a ratio between efficiency corresponding to a first CQI and efficiency corresponding to a second CQI.

According to an aspect of the present disclosure, a terminal in a communication system includes a controller for measuring channel quality, and a transmitter for transmitting a CQI based on the channel quality measured on the basis of a target BLER, wherein the target BLER is determined by using a ratio between efficiency corresponding to a first CQI and efficiency corresponding to a second CQI.

According to an aspect of the present disclosure, a base station in a communication system includes a receiver that receives a CQI according to a channel quality based on a target BLER, and a controller that manages a modulation scheme or a code rate based on the received CQI, wherein the target BLER is determined by using a ratio between efficiency corresponding to a first CQI and efficiency corresponding to a second CQI.

According to an aspect of the present disclosure, a method for operating a base station includes receiving a CQI according to a channel quality based on a target BLER, and managing a modulation scheme or a code rate based on the received CQI, wherein the target BLER is determined by using a ratio between efficiency corresponding to a first CQI and efficiency corresponding to a second CQI. The present disclosure describes a technique of selecting a CQI by determining a target reception error rate, i.e., a target BLER.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF EMBODIMENTS OF THE PRESENT DISCLOSURE

Embodiments of the present disclosure will be described herein below with reference to the accompanying drawings. In the following description, well-known functions or constructions are not described in detail since they would obscure the invention in unnecessary detail.

The present disclosure describes a technique of selecting a CQI by determining a target reception error rate, such as a target BLER. A terminal includes a mobile communication terminal such as a cellular phone and a smart phone. Although the present disclosure describes a Long Term Evolution (LTE) system as an example, the present disclosure is not limited thereto and thus is also applicable to other systems.

A wireless communication system uses a CQI to increase a transmission capacity. The terminal measures radio channel quality in a location where the terminal is currently present, and transmits the radio channel quality to a base station. The base station may manage a modulation scheme or a code rate on the basis of the radio channel quality. In LTE, $1^{st}$ to $15^{th}$ CQIs are used, and a modulation scheme, a code rate, and efficiency are defined for each CQI as shown in Table 1 as follows.

TABLE 1

| CQI | modulation | Code rate × 1024 | efficiency |
|---|---|---|---|
| 0 | out of range | | |
| 1 | QPSK | 78 | 0.1523 |

TABLE 1-continued

| CQI | modulation | Code rate × 1024 | efficiency |
|---|---|---|---|
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

As shown in Table 1, when a CQI order is high, a higher-order modulation scheme is selected, and a code rate and efficiency are increased. Therefore, higher efficiency can be acquired when a higher CQI is selected. However, since a BLER of a CQI differs depending on channel quality, a selectable CQI order is limited depending on the channel quality. Although Modulation and Coding Scheme (MCS) efficiency corresponding to a CQI is determined by using the modulation scheme and the code rate in the Table 1, the MCS efficiency corresponding to the CQI may be determined according to a transport block size of the MCS and the number of Physical Downlink Shared CHannel (PDSCH) Resource Elements (REs).

Figure 1:
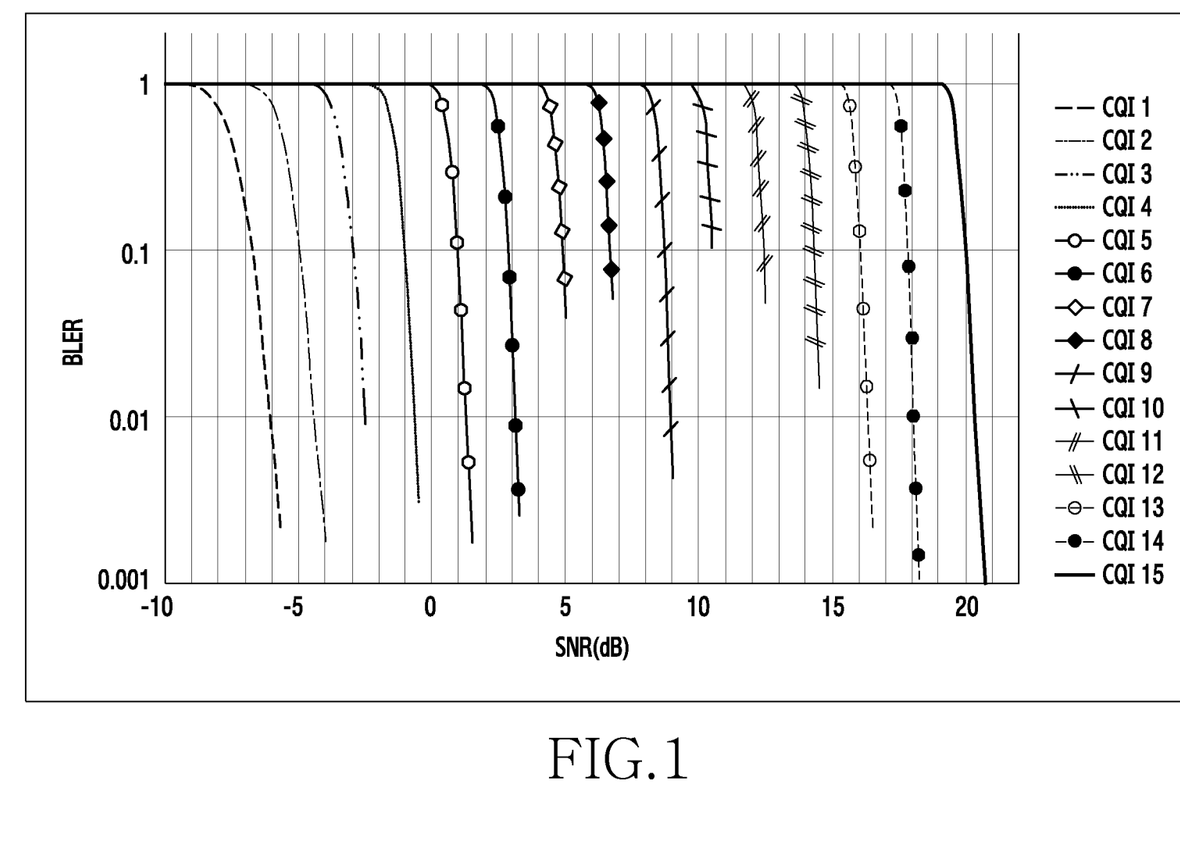
FIG. 1 illustrates a correlation between a Signal to Noise Ratio (SNR) and a BLER according to to which the present disclosure is applied.

FIG. 1 illustrates a correlation between an SNR and a BLER to which the present disclosure is applied.

In FIG. 1, a horizontal axis indicates the SNR, and a vertical axis indicates the BLER. Referring to FIG. 1, it can be seen that the higher the SNR, the lower the BLER of each CQI. In other words, the higher the channel quality, the higher the reception success rate. More specifically, considering CQI 1 for example, if the SNR is about −10 dB, the BLER is close to 100%, whereas if the SNR is about −6.8 dB, the BLER is decreased to 10% and if the SNR is about −6 dB, the BLER is decreased to close to 1%.

Similar to CQI 1, the BLER is also decreased with the aforementioned pattern in each of the other CQIs. In addition, there is a limitation in a selectable CQI according to the SNR. Since the BLER differs for each CQI, the selectable CQI also differs. Referring to FIG. 1, each CQI has a duration in which the BLER is 100%. When selecting a CQI corresponding to the duration in which the BLER is 100%, it is expected that reception is not possible. For example, as to CQI 15, since the BLER is 100% in a duration in which the SNR is less than or equal to about 19 dB, CQI 15 cannot be selected in the duration in which the SNR is less than or equal to about 19 dB. Therefore, there is a need for a method capable of increasing a throughput by selecting a CQI in consideration of a BLER within a range of a maximum CQI that can be selected according to an SNR.

Figure 2:
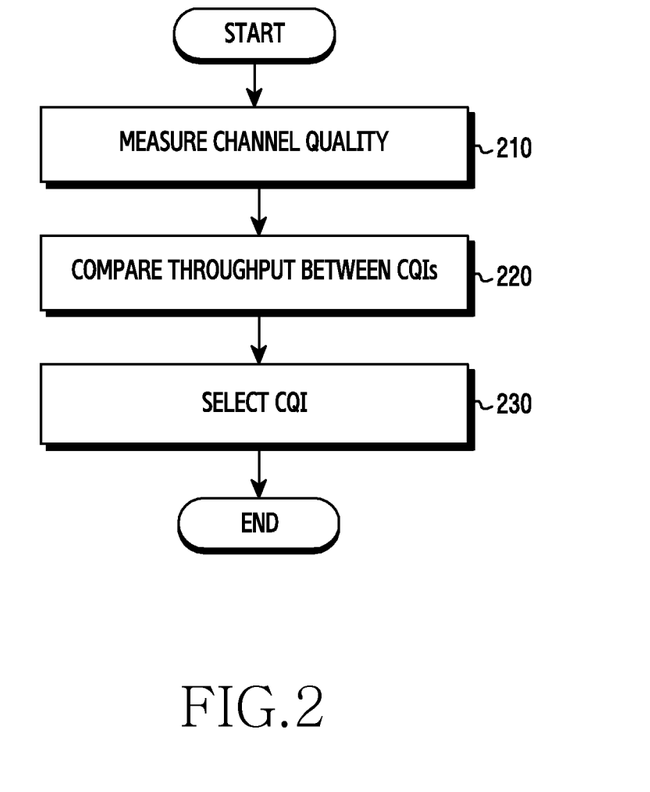
FIG. 2 illustrates a process of determining a target BLER in a communication system according to an embodiment of the present disclosure.

FIG. 2 illustrates a process of determining a target BLER in a communication system according to an embodiment of the present disclosure.

In step 210, a terminal measures channel quality. Specifically, the terminal measures power of a received signal, and measures a received noise. Thereafter, the terminal measures the channel quality by using a ratio of the power of the received signal and the received noise (hereinafter, SNR). When the measured SNR is high, a ratio of the received signal to noise is low, which indicates that channel quality is good. The measured SNR is used as a criterion of selecting a CQI by the terminal.

In step 220, the terminal compares a throughput per CQI. When assuming a Hybrid Automatic Retransmission reQuest (HARQ) scheme, the throughput per CQI may be as shown in the following Equation (1) when channel quality is given. Herein, the channel quality may include an SNR, a Signal to Interference plus Noise Ratio (SINR), a Carrier to Interference plus Noise Ratio (CINR), a Mean Mutual Information per Symbol (MMIS), and a Mean Mutual Information per coded Bit (MMIB).

$$T = \frac{SE}{(1 + P1(1 + P2(1 + P3(1 + \ldots ))))} \quad (1)$$

In Equation (1), T denotes the throughput per CQI, Spectral Efficiency (SE) denotes efficiency corresponding to a CQI (e.g., the efficiency of Table 1 above), and Pk denotes a probability of $k^{th}$ retransmission. It is assumed that P1 may be obtained depending on given channel quality, and P2 is equal to a retransmission rate (i.e., a data reception error probability) at channel quality which is improved by 3 dB over a current SNR under the premise that chase combining is used since it is complex to perform modeling on reception capability of data that has undergone Incremental Redundancy (IR). Herein, the improvement by 3 dB is achieved under the premise that a channel change is relatively slow. However, when the channel change is fast, it is presumably equal to an SNR at a current time point if a channel at a retransmission time point is independent of the channel at the current time point. Similarly to P2, it is assumed that P3 and P4 have the same retransmission rate at channel quality improved by 4.8 dB and 6 dB.

Referring back to FIG. 1, a correlation between an SNR and a BLER is examined for 15 CQIs of LTE in an Additive White Gaussian Noise (AWGN) environment. If P1 is a proper level (e.g., less than 90%) at initial transmission, P2 is a negligible level. Likewise, P3 and P4 are also negligible levels. Therefore, Equation (1) above can be simplified to Equation (2) according to the aforementioned examination results and assumptions.

$$T = \frac{SE}{(1 + P1)} \quad (2)$$

If an $m^{th}$ CQI applied to Equation (2) is denoted by T(m), Equation (2) may be as shown as Equation (3), as follows.

$$T(m) = \frac{SE(m)}{(1 + P1(m))} \quad (3)$$

In order to select an optimal CQI in terms of throughput maximization, a throughput per CQI, i.e., T(1), T(2), . . . ,T(15), is compared to select an $m^{th}$ CQI having a maximum throughput. Assuming a channel environment in which a first retransmission rate P1(m) of the $m^{th}$ CQI, as shown in FIG. 1, P1(1), P1(2), . . . ,P1(m−1) have values close to 0. Therefore, a maximum value among T(1), T(2), . . . , T(m−1) is T(m−1), and a value thereof is equal to SE(m−1) since P1(1), P1(2), . . . ,P1(m−1) have values close to 0. As further shown in FIG. 1, in a channel quality range in which P1(m) has a proper value, P1(m+1), P1(m+

2), ... ,P1(15) all have a value of 1, and second retransmission rates P2(m+1), P2(m+2), ... , P2(15) have values close to 1. Referring back to Table 1, since there is no instance where an $(m+1)^{th}$ CQI is greater than the $m^{th}$ CQI by more than two times in terms of efficiency, T(m) has a maximum value as a result of comparing T(m), T(m+1), T(m+2), ... , T(15).

Based on the above conclusion, an optimal throughput may be found by comparing T(m−1) and T(m) in Equation (4), as follows.

$$T(m) > T(m-1) \quad (4)$$

Equation (3) above may be modified by Equation (4) above to derive Equation (5), as follows.

$$SE(m-1) = \frac{SE(m)}{(1 + P1(m))} \quad (5)$$

Equation (5) may be modified to derive Equation (6), as follows.

$$\frac{SE(m)}{SE(m-1)} - 1 > P1(m) \quad (6)$$

A condition in which an $m^{th}$ CQI throughput T(m) is greater than an $(m-1)^{th}$ CQI throughput T(m−1) is that an $m^{th}$ CQI initial packet BLER Pl(m) is less than SE(m)/SE(m−1)−1. That is, from a perspective of throughput maximization, a maximum BLER capable of selecting the $m^{th}$ CQI is SE(m)/SE(m−1)−1.

A maximum BLER per CQI finally derived by the aforementioned procedures and Table 1 above is as shown in Table 2 below. Hereinafter, the maximum BLER is referred to as a target BLER.

TABLE 2

| CQI | Target BLER |
|---|---|
| 2 | 0.539 |
| 3 | 0.608 |
| 4 | 0.596 |
| 5 | 0.458 |
| 6 | 0.341 |
| 7 | 0.256 |
| 8 | 0.296 |
| 9 | 0.257 |
| 10 | 0.135 |
| 11 | 0.217 |
| 12 | 0.175 |
| 13 | 0.159 |
| 14 | 0.131 |
| 15 | 0.086 |

The target BLER may be applied differently when using a plurality of CQIs in a similar fashion to 3G (3rd Generation), in which case a throughput T per CQI may be predetermined by using Equation (1) for every specific value of channel quality. For example, if the channel quality is an SNR, the throughput T per CQI may be obtained in unit of 0.1 dB by using Equation (1). Thereafter, a CQI having a maximum throughput may be implemented into a database for each SNR sample. In a channel quality range in which each CQI is selected, a maximum BLER having a corresponding CQI may be determined as a target BLER of the corresponding CQI.

When the target BLER per CQI is determined by the aforementioned process, channel quality having a corresponding target BLER may be predetermined as a threshold of each CQI channel quality. For example, channel quality throughputs of CQI 1 to CQI may be respectively −7, −5, −3, 0, 3, 7, 9, 11, 13, 14, 15, 16, 18, 19, 20 dB.

Returning to FIG. 2, in step 230, the terminal selects a CQI according to the determined target BLER which, as stated above, is a maximum BLER having a corresponding CQI. Conventionally, the target BLER is equally determined as being 10% in all CQIs. However, the present disclosure differently determines a target BLER per CQI, and thereafter selects the CQI according to the determined target BLER.

Figure 3:
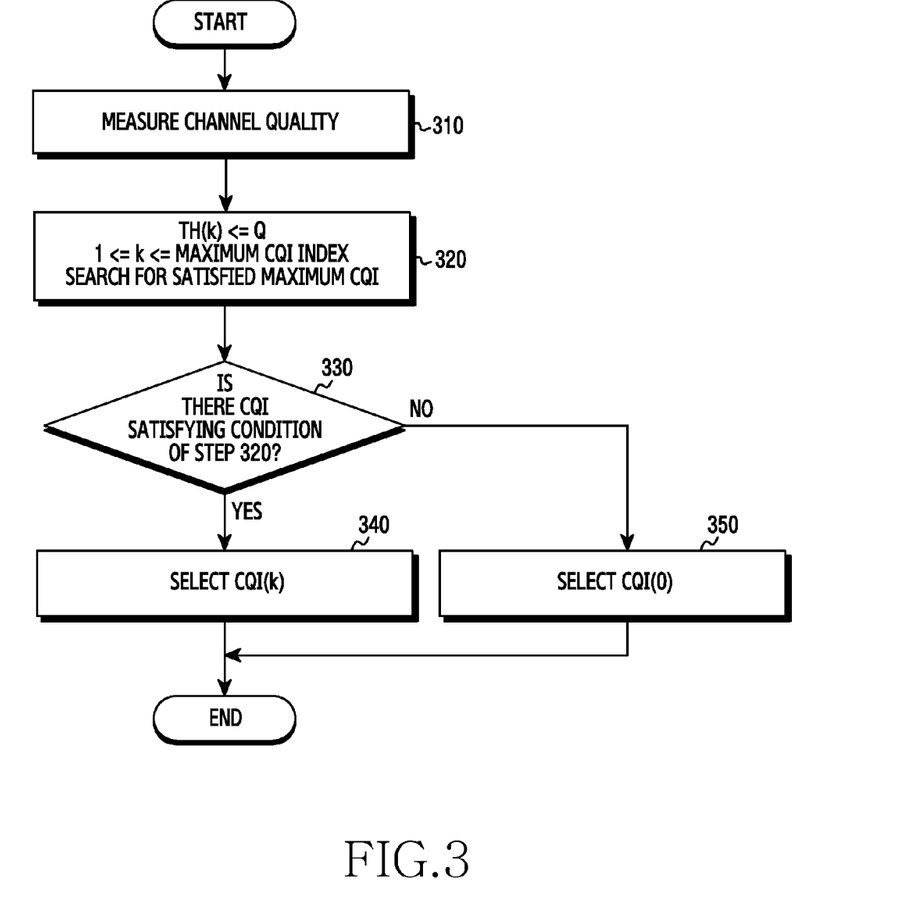
FIG. 3 illustrates a process of selecting a CQI according to an embodiment of the present disclosure.

FIG. 3 illustrates a process of selecting a CQI based on a criterion according to an embodiment of the present disclosure.

In step 310, a terminal measures channel quality Q. Specifically, the terminal measures power of a received signal and measures a received noise. Thereafter, the terminal measures the channel quality by using an SNR. When the measured SNR is high, a ratio of the received signal to noise is low, which indicates that the channel quality is good. The measured SNR is used by the terminal as a criterion of selecting a CQI.

In step 320, the terminal compares the channel quality Q with a channel quality threshold TH of the CQI to determine whether there is a threshold less than the channel quality.

In step 330, if the condition of step 320 is satisfied, that is, if the threshold less than the channel quality exists, the process proceeds to step 340, in which the terminal selects a CQI(k) corresponding to a threshold having a maximum value among thresholds satisfying the condition of the step 320. If the condition of step 320 is not satisfied, that is, if the threshold less than the channel quality does not exist, the process proceeds to step 350, in which the terminal selects a CQI 0.

Figure 4:
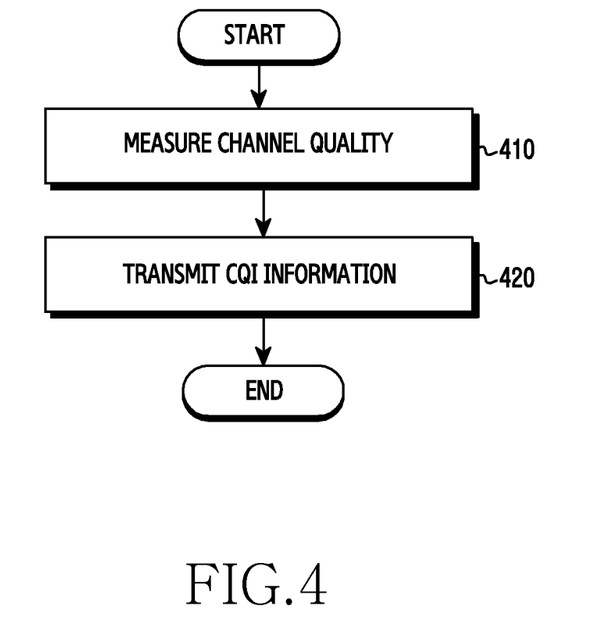
FIG. 4 illustrates a process of selecting a CQI according to an embodiment of the present disclosure.

FIG. 4 illustrates a process of selecting a CQI according to an embodiment of the present disclosure.

In step 410, the terminal measures the channel quality. Specifically, the terminal measures power of a received signal, and measures a received noise. Thereafter, the terminal measures the channel quality by using an SNR. When the measured SNR is high, a ratio of the received signal to noise is low, which indicates that the channel quality is good. The measured SNR is used by the terminal as a criterion of selecting a CQI.

In step 420, the terminal transmits CQI information. Specifically, the terminal determines a target BLER per CQI by using Equations (1) to (6), and stores a table of the determined target BLER per CQI. Thereafter, the terminal detects current channel quality and confirms a selectable CQI at the current channel quality. The terminal confirms a target BLER determined for the selectable CQI, and thereafter selects a CQI not exceeding the determined target BLER at the channel quality. For example, if a CQI(k) and a CQI(k−1) are selectable at a specific channel quality, a target BLER determined for CQI(k) and CQI(k−1) is confirmed, and CQI information is transmitted by selecting a CQI, of which a BLER at the specific channel quality does not exceed the determined target BLER, between CQI(k) and CQI(k−1).

Figure 5:
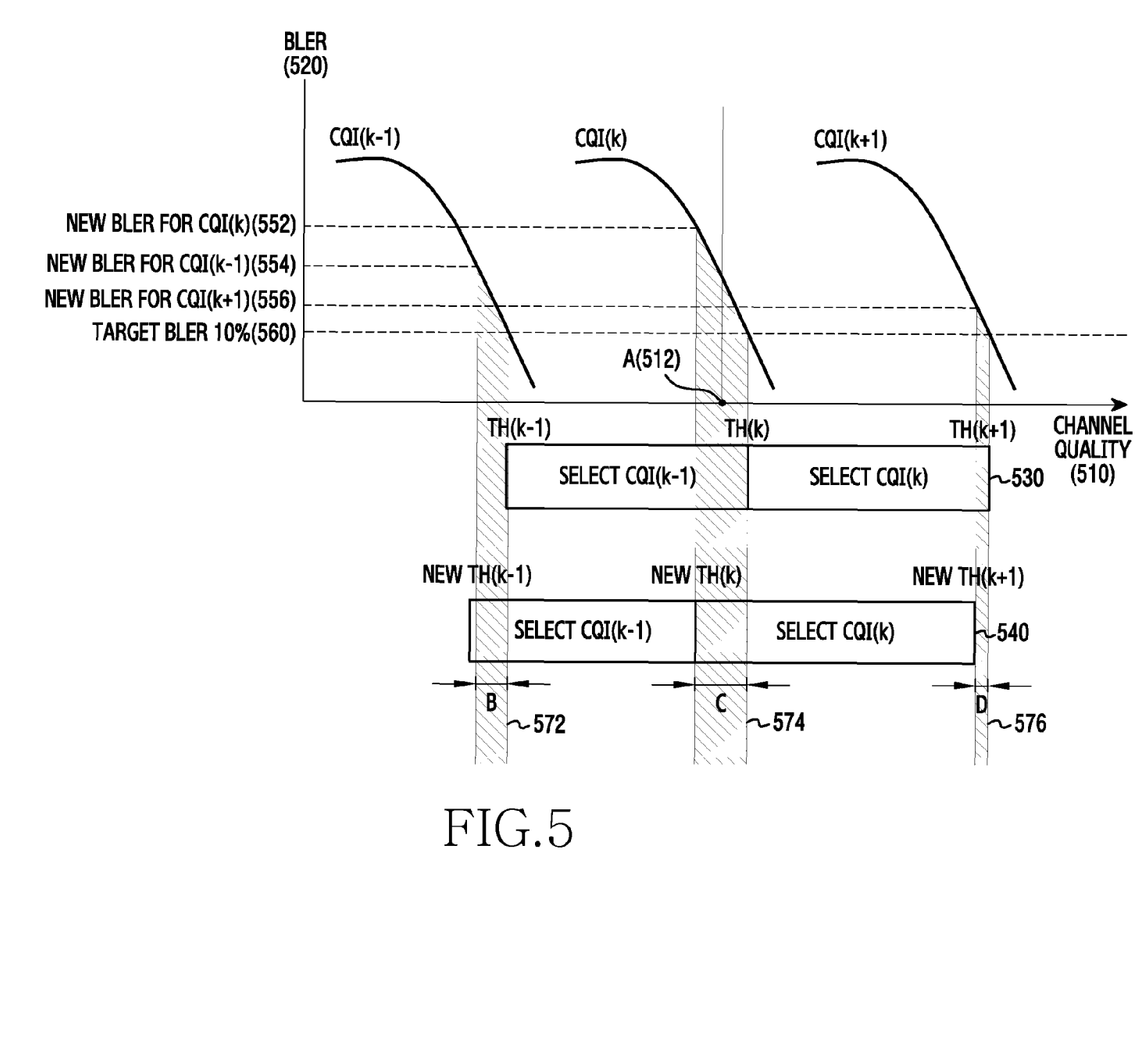
FIG. 5 illustrates a correlation between a target BLER and a CQI selection according to an embodiment of the present disclosure.

FIG. 5 illustrates a correlation between a target BLER and a CQI selection according to an embodiment of the present disclosure.

Referring to FIG. 5, the horizontal axis indicates channel quality 510, and the vertical axis indicates a BLER 520. In the conventional technique, a target BLER of 10% is equally applied to all CQIs (see 560). Therefore, when a specific CQI exceeds 10% according to the channel quality, the terminal collectively selects a CQI other than the specific CQI. However, according to an embodiment of the present disclosure, the terminal applies different target BLERs to respective CQIs (see 552, 554, and 556). Therefore, a range 540 of the CQI selected by the terminal according to the channel quality is different from a conventional range 530 of a selected CQI. For example, assuming that a CQI is selected at specific channel quality A 512, if the conventional target BLER 10% 560 is applied, a BLER of CQI(k) at channel quality A 512 exceeds 10%. As a result, CQI(k) cannot be selected and thus CQI(k−1) can be selected. However, according to the present disclosure, a CQI is selected by applying a new BLER at the channel quality A 512. In this case, the BLER of CQI(k) at channel quality A 512 does not exceed a BLER 552 for the newly determined CQI(k), and thus the terminal can select CQI(k) at channel quality A 512. If the BLER for the newly determined CQI is applied, FIG. 5 illustrates that a CQI is selected differently in durations B 572, C 574, and D 576 in comparison with the conventional CQI selection method. That is, a higher CQI is selected in some durations in comparison with the conventional CQI selection method.

Table 3 below shows a throughput gain according to a CQI selection method to which a new BLER is applied.

TABLE 3

| Fading | Transmission Mode | MIMO Correlation | SNR | Tput [Mbps] with Target BLER 10% for all CQI | Tput [Mbps] with New Target BLER per CQI | Relative Tput gain |
| --- | --- | --- | --- | --- | --- | --- |
| ETU70 | TM3 | Low | 15 | 27.1 | 28.6 | 5.5% |
| ETU70 | TM3 | Low | 10 | 17.1 | 18.2 | 6.4% |
| ETU70 | TM3 | Low | 5 | 9.1 | 9.5 | 4.4% |
| ETU300 | TM3 | Low | 15 | 27 | 28.4 | 5.2% |
| ETU300 | TM3 | Low | 10 | 17.1 | 17.6 | 2.9% |
| ETU300 | TM3 | Low | 5 | 9 | 9.4 | 4.4% |

Referring to Table 3, it can be seen that the throughput to which the new BLER is applied is higher than the throughput to which a BLER of 10% is applied.

Figure 6:
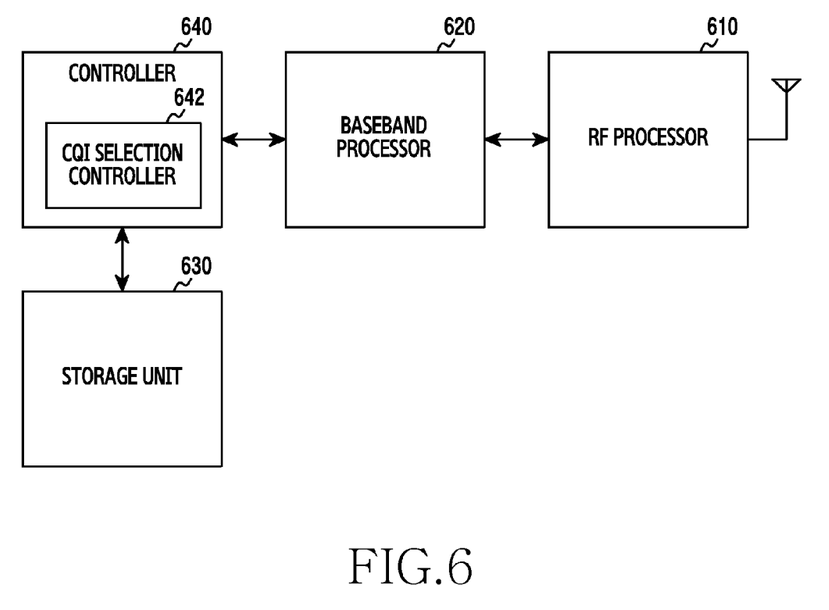
FIG. 6 is a block diagram of a terminal apparatus according to an embodiment of the present disclosure.

FIG. 6 is a block diagram of a terminal apparatus according to an embodiment of the present disclosure.

Referring to FIG. 6, the apparatus includes a Radio Frequency (RF) processor 610, a baseband processor 620, a storage unit 630, a controller 640, and a CQI selection controller 642.

The RF processor 610 performs a function for transmitting and receiving a signal through a radio channel by performing processes such as signal band conversion and amplification. That is, the RF processor 610 up-converts a baseband signal provided from the baseband processor 620 into an RF signal, and then transmits the RF signal through an antenna, and also down-converts an RF signal received through the antenna into a baseband signal. For example, the RF processor 610 may include a transmission filter, a reception filter, an amplifier, a mixer, an oscillator, a Digital to Analog Converter (DAC), and an Analog to Digital Converter (ADC). Although only one antenna is illustrated in FIG. 6, the transmitting end may have multiple antennas.

The baseband processor 620 performs a conversion function between a baseband signal and a bit-stream according to a physical layer protocol of the system. For example, in a data transmission process, the baseband processor 620 generates complex symbols by performing coding and modulation on a transmitted bit-stream. In a data reception process, the baseband processor 620 restores a received bit-stream by performing demodulation and decoding on the baseband signal provided from the RF processor 610. For example, when conforming to an Orthogonal Frequency Division Multiplexing (OFDM) scheme, in a data transmission process, the baseband processor 620 generates complex symbols by performing coding and modulation on a transmitted bit-stream, maps the complex symbols to subcarriers, and then configures OFDM symbols by performing an Inverse Fast Fourier Transform (IFFT) operation and a Cyclic Prefix (CP) insertion operation. In a data reception process, the baseband processor 620 splits the baseband signal provided from the RF processor 610 on an OFDM symbol basis, restores signals mapped to the subcarriers by using a Fast Fourier Transform (FFT) operation, and then restores a received bit-stream by performing demodulation and decoding. The baseband processor 620 and the RF processor 610 may be called a transmitter, a receiver, a transceiver, or a communication unit which transmits CQI information.

The storage unit 630 stores data such as a basic program for an operation of a device for CQI selection, an application program, and setup information. In particular, the storage unit 630 may store information for the CQI selection, i.e, information related to a BLER. The storage unit 630 provides the stored data at the request of the controller 640.

The controller 640 controls overall operations of the device for the CQI selection. For example, the controller 640 transmits/receives a signal via the baseband processor 620 and the RF processor 610, and writes and reads data to and from the storage unit 630. In FIG. 6, the controller 640 includes the CQI selection controller 642, which controls the device for the CQI selection to perform the procedure of FIG. 2, FIG. 3, and FIG. 4. The operation of the controller 640 according to the embodiment of the present disclosure is as follows.

The controller 640 measures channel quality. Specifically, the controller 640 measures power of a received signal and measures a received noise. Thereafter, the controller 640 measures the channel quality by using an SNR. The controller 640 determines a target BLER per CQI by using Equations (1) to (6). The controller 640 selects a CQI by detecting current channel quality and then confirming a selectable CQI at the channel quality, confirming a target BLER determined for the selectable CQI, and selecting a CQI not exceeding the determined target BLER at the channel quality.

A method for operating a terminal in a communication system includes measuring channel quality and transmitting a CQI according to the channel quality based on a target BLER, which is determined by using a ratio between efficiency corresponding to a first CQI and efficiency corresponding to a second CQI. The efficiencies corresponding to the first and second CQIs are determined by using a modulation order and a code rate, and by using a transport block size and modulation order of an MCS and the number of Physical Downlink Shared CHannel (PDSCH) resource elements.

The target BLER is determined by subtracting 1 from a value obtained by dividing the efficiency of the first CQI by the efficiency of the second CQI, and by using a condition in which an initial packet BLER is less by 1 than a value obtained by dividing the first CQI efficiency by the second CQI efficiency.

The method further includes determining a CQI retransmission rate based on the channel quality and the target BLER according to the determined CQI retransmission rate.

The first CQI efficiency and the second CQI efficiency are determined by using a product between a throughput per CQI and a packet retransmission rate. In determining the target BLER, Equation (6) is used:

$$\frac{SE(m)}{SE(m-1)} - 1 > P1(m),$$

where SE(m) denotes efficiency of an $m^{th}$ CQI, and P1(m) denotes an initial packet BLER. If a plurality of CQIs is used, the method further includes predetermining a throughput per CQI using Equation (1):

$$T = \frac{SE}{(1 + P1(1 + P2(1 + P3(1 + \ldots))))},$$

where T denotes the throughput per CQI, Spectral Efficiency (SE) denotes efficiency corresponding to a CQI, and Pk denotes a probability of $k^{th}$ retransmission.

An apparatus in a communication system includes a controller for measuring channel quality, and a transmitter for transmitting a CQI according to the channel quality based on a target BLER, which is determined by using a ratio between efficiency corresponding to a first CQI and efficiency corresponding to a second CQI. The controller determines the efficiency corresponding to the CQI by using a modulation order and a code rate, a throughput per CQI if a plurality of CQIs is used, a transport block size and modulation order of an MCS and the number of PDSCH resource elements.

The controller determines the target BLER by subtracting 1 from a value obtained by dividing the efficiency of the first CQI by the efficiency of the second CQI, and by using a condition in which an initial packet BLER is less by 1 than a value obtained by dividing the first CQI efficiency by the second CQI efficiency. The controller determines a CQI retransmission rate based on the channel quality, and the target BLER according to the determined CQI retransmission rate. The controller determines the first CQI efficiency and the second CQI efficiency by using a product between a throughput per CQI and a packet retransmission rate. The controller determines the target BLER by using Equation (6), as follows:

$$\frac{SE(m)}{SE(m-1)} - 1 > P1(m),$$

where SE(m) denotes efficiency of an $m^{th}$ CQI, and P1(m) denotes an initial packet BLER. The controller predetermines a throughput per CQI if a plurality of CQIs is used, by using Equation (1), as follows:

$$T = \frac{SE}{(1 + P1(1 + P2(1 + P3(1 + \ldots))))},$$

where T denotes the throughput per CQI, SE) denotes efficiency corresponding to a CQI, and Pk denotes a probability of $k^{th}$ retransmission.

According to an embodiment of the present disclosure, a CQI for a throughput maximization is selected, which promotes an increase in throughput.

According to an embodiment of the present disclosure, an improved CQI selection method is provided by differently determining a target BLER per CQI.

Methods based on the embodiments disclosed in the claims and/or specification of the present disclosure can be implemented in hardware, software, or a combination of both.

When implemented in software, computer readable recording medium for storing one or more programs (i.e., software modules) can be provided. The one or more programs stored in the computer readable recording medium are configured to be executed by one or more processors in an electronic device. The one or more programs include instructions for allowing the electronic device to execute the methods based on various embodiments disclosed in the claims and/or specification of the present disclosure.

The program (i.e., the software module or software) can be stored in a Random Access Memory (RAM), a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. The configured memory may be plural in number.

The program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can access the electronic device via an external port. An additional storage unit on a communication network can access a portable electronic device.

In embodiments of the present disclosure, a constitutional element included in the invention is expressed in a singular or plural form according to the specific example embodiment disclosed herein. However, the singular or plural expression is selected properly for a particular situation for the convenience of explanation, and thus the disclosure is not limited to a single or a plurality of constitutional elements. Therefore, a constitutional element expressed in a plural form can also be expressed in a singular form, or vice versa.

While the present disclosure has been particularly shown and described with reference to certain embodiments thereof, it will be understood by those skilled in the art that various changes in form and details may be made therein without departing from the spirit and scope of the present disclosure as defined by the appended claims.

What is claimed is:

1. A method for operating a terminal in a communication system, the method comprising:
    measuring channel quality; and
    transmitting a Channel Quality Indicator (CQI) according to the channel quality based on a target BLock Error Rate (BLER),
    wherein the target BLER is determined based on a ratio between efficiency corresponding to a first CQI and efficiency corresponding to a second CQI.

2. The method of claim 1, wherein the efficiencies corresponding to the first and second CQIs are determined based on a modulation order and a code rate.

3. The method of claim 1, wherein the efficiencies corresponding to the first and second CQIs are determined based on a transport block size and modulation order of a Modulation and Coding Scheme (MCS) and a number of Physical Downlink Shared CHannel (PDSCH) resource elements.

4. The method of claim 1, wherein determining the target BLER further comprises subtracting 1 from a value obtained by dividing the efficiency of the first CQI by the efficiency of the second CQI.

5. The method of claim 1, further comprising:
    determining a CQI retransmission rate based on the channel quality; and
    determining the target BLER according to the determined CQI retransmission rate.

6. The method of claim 1, wherein determining the target BLER further comprises using a condition in which an initial packet BLER is less by 1 than a value obtained by dividing the first CQI efficiency by the second CQI efficiency.

7. The method of claim 1, wherein the first CQI efficiency and the second CQI efficiency are determined by using a product between a throughput per CQI and a packet retransmission rate.

8. The method of claim 1, further comprising, if a plurality of CQIs are used, predetermining a throughput per CQI.

9. A terminal in a communication system, the terminal comprising:
    a controller that measures channel quality; and
    a transmitter that transmits a Channel Quality Indicator (CQI) according to the channel quality based on a target BLock Error Rate (BLER),
    wherein the target BLER is determined based on a ratio between efficiency corresponding to a first CQI and efficiency corresponding to a second CQI.

10. The terminal of claim 9, wherein the controller determines the efficiencies corresponding to the first and second CQIs by using a modulation order and a code rate, and a throughput per CQI if a plurality of CQIs is used.

11. The terminal of claim 9, wherein the controller determines the efficiencies corresponding to the first and second CQIs by using a transport block size and modulation order of a Modulation and Coding Scheme (MCS) and a number of Physical Downlink Shared CHannel (PDSCH) resource elements.

12. The terminal of claim 9, wherein the controller further determines the target BLER by subtracting 1 from a value obtained by dividing the efficiency of the first CQI by the efficiency of the second CQI.

13. The terminal of claim 9, wherein the controller determines a CQI retransmission rate based on the channel quality, and further determines the target BLER according to the determined CQI retransmission rate.

14. The terminal of claim 9, wherein the controller further determines the target BLER based on a condition in which an initial packet BLER is less by 1 than a value obtained by dividing the first CQI efficiency by the second CQI efficiency.

15. The terminal of claim 9, wherein the controller determines the first CQI efficiency and the second CQI efficiency based on a product between a throughput per CQI and a packet retransmission rate.

16. A chip set, configured to:
    measure channel quality;
    transmit a Channel Quality Indicator (CQI) according to the channel quality based on a target BLock Error Rate (BLER),
    wherein the target BLER is determined based on a ratio between efficiency corresponding to a first CQI and efficiency corresponding to a second CQI.

17. The chip set of claim 16, wherein the chipset determines the efficiencies corresponding to the first and second CQIs based on a modulation order and a code rate, and a throughput per CQI if a plurality of CQIs are used.

18. The chipset of claim 16, wherein the chipset determines the efficiencies corresponding to the first and second CQIs based on a transport block size and modulation order of a Modulation and Coding Scheme (MCS) and the a number of Physical Downlink Shared CHannel (PDSCH) resource elements.

19. The chipset of claim 16, wherein the chipset determines the target BLER by subtracting 1 from a value obtained by dividing the efficiency of the first CQI by the efficiency of the second CQI.

20. The chipset of claim 16, wherein the chipset determines a CQI retransmission rate based on the channel quality, and further determines the target BLER according to the determined CQI retransmission rate.

* * * * *